June 24, 1958    F. M. GUY ET AL    2,840,403
UNIVERSAL JOINTS AND RESILIENT BUSHINGS
Original Filed Dec. 6, 1951
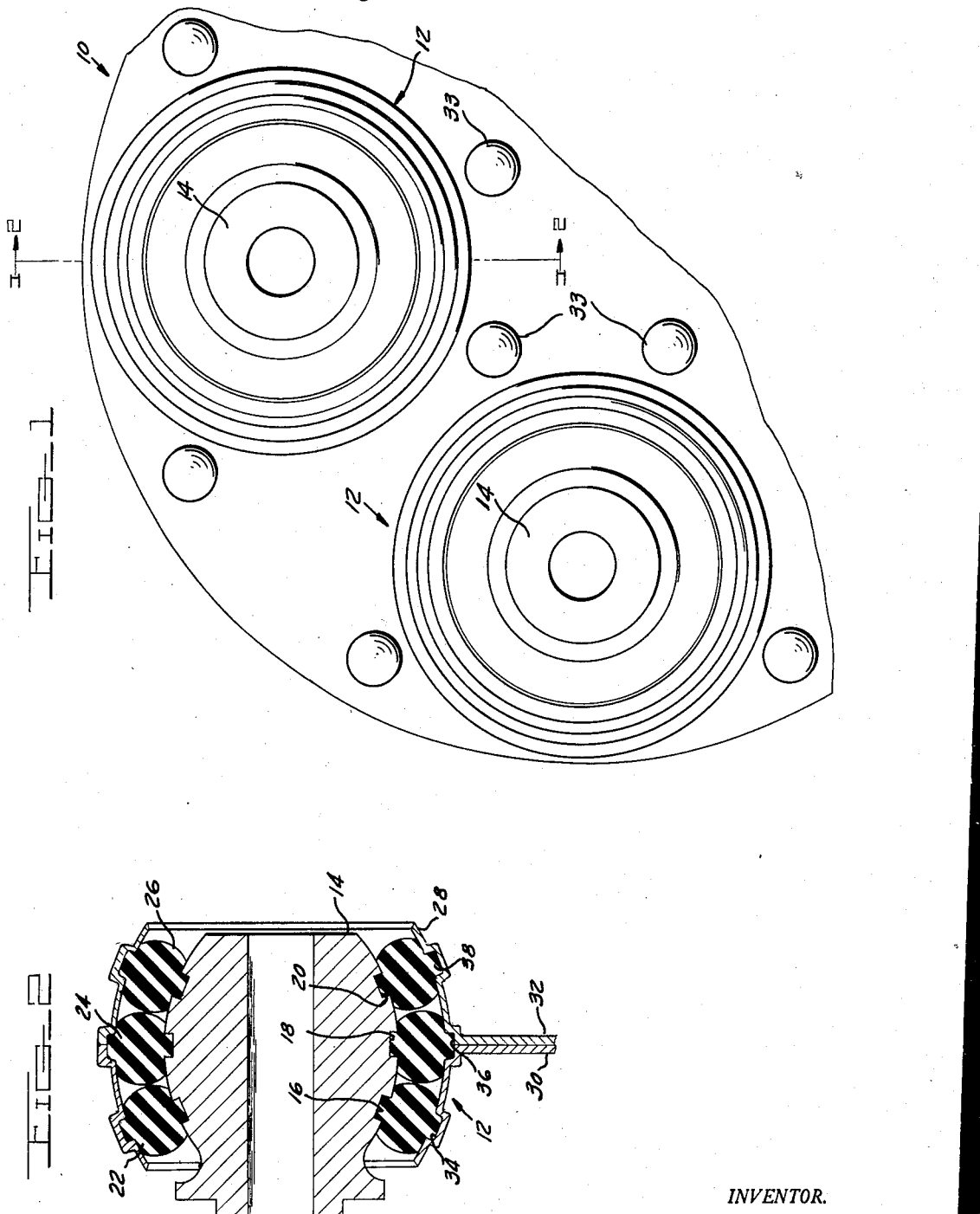
INVENTOR.
FREDERICK M. GUY
BY  CURT SAURER
SMITH, WILSON, LEWIS & McRAE United States Patent Office 2,840,403
Patented June 24, 1958

2,840,403
UNIVERSAL JOINTS AND RESILIENT BUSHINGS

Frederick M. Guy and Curt Saurer, Detroit, Mich., assignors to U. S. Universal Joints Company, Detroit, Mich.

Continuation of application Serial No. 260,206, December 6, 1951. This application June 3, 1954, Serial No. 434,230

4 Claims. (Cl. 287—85)

The present invention relates to improvements in universal joint mechanisms and resilient bushings particularly adapted for such mechanisms and more specifically to a resilient bushing having a plurality of separate resilient elements therein.

The present application is a continuation of our co-pending application Serial No. 260,206 filed December 6, 1951, now abandoned. Universal joints of the general type with which the present application is concerned include a carrier member which has a plurality of resilient bushings therein some of which are adapted for connection to a driving shaft and some of which are adapted for connection to a driven shaft. These resilient bushings consist generally of a central core or connector member, an outer shell spaced therefrom, and a resilient element disposed between the shell and core.

Prior to the present invention, a compact universal joint was sought which would have a substantial torque capacity and which at the same time would eliminate the usual high resistance to angular and longitudinal movement of the component parts thereof. Such a joint is dependent upon the resilient bushings used therein for such characteristics. To provide a resilient bushing having satisfactory torque capacity, it has generally been necessary to use a heavy rubber element, and preload the rubber element to such an extent that the element would be under excessive compression in its normal undisplaced position.

Therefore, it is a primary object of the present invention to provide a universal joint which has a high torque capacity, and at the same time has a reduced resistance to angular and longitudinal movement.

It is another object of the present invention to provide a resilient bushing particularly adapted for use in a universal joint which will accomplish the desired features set out in the previous object.

It is another object of the present invention to provide a resilient bushing having a resilient element which is divided into a plurality of separate resilient blocks which prevent concentration of stresses and consequent failure of the resilient element.

It is another object of the present invention to provide a resilient bushing having a plurality of separate resilient blocks which cooperate to provide minimum resistance to movement at the point of greatest load.

It is another object of the present invention to provide an improved universal joint and resilient bushing which are efficient in operation and which are readily adapted for economical manufacture by mass production methods.

Other objects of this invention will appear in the following description and appended claims, reference being had to the accompanying drawings forming a part of this specification wherein like reference characters designate corresponding parts in the several views.

In the drawings:

Fig. 1 is a fragmentary elevation of a universal joint including a plurality of resilient bushings and embodying the present invention.

Fig. 2 is a fragmentary section taken along the line 2—2 in the direction of the arrows, Fig. 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

A particular embodiment of the present invention is shown in the drawings. A universal joint is denoted generally by the number 10 in Fig. 1 of the drawings. The coupling utilizes a plurality of resilient bushings 12. A more detailed view of the universal joint and the specific construction of the bushings is disclosed in Fig. 2.

Each bushing 12 includes a substantially barrel-shaped central core 14 having a plurality of annular grooves 16, 18 and 20 formed therein. Three separate resilient blocks 22, 24 and 26 are disposed one in each of the annular grooves 16, 18 and 20 respectively. The outer shell of the bushing is denoted by the number 28 and is formed by the complemental stampings 30 and 32 which are fastened together by any suitable means such as the rivets 33. The outer shell 28 provides the grooves 34, 36 and 38 which are aligned with the grooves 16, 18 and 20 in the core 14 and which seat the resilient blocks 22, 24 and 26. By dividing the resilient element of the bushing into a plurality of separate resilient blocks the stress concentration often experienced in a single large resilient element is avoided. Thus, the bushing is efficient and has a long service life.

To prevent lateral slipping of the resilient block on the core, a suitable connection is provided between the resilient block and the core. This connection may be a mechanical connection, or it may be provided by the use of a suitable adhesive in the groove of the core for bonding the resilient block to the contacting surfaces of the core, or it may be a combination of the two. An example of a mechanical connection is disclosed in our co-pending application, Serial No. 267,749 filed January 23, 1952, now abandoned wherein longitudinal beads on the resilient element extend into longitudinal channels in the core.

The central resilient block 24 may be assembled in an inverted or negative condition as explained more fully in our co-pending application Serial No. 225,040 filed May 7, 1951. In other words, the substantially ring or torus-shaped element 24 has been turned inside out so that the part which was originally the inner circumference in the normal position is now the outer circumference, and the part which was originally the outer circumference in the normal position is now the inner circumference. Thus, when the outer shell 28 or the central core 14 is moved either endwise or to an angular direction, the inverted block 24 tends to return to its original molded or uninverted position. In this manner any endwise or angular movement is aided and not restrained as in a conventional bushing. Less heat is generated and the resilient block 24 will withstand larger and more rapid movement than resilient elements heretofore used. In a three block construction such as shown in the drawings it is preferable to place the inverted resilient block in the center groove. It has been discovered that this is the point which bears most of the load when the bushing is distorted.

The resilient blocks 22 and 26 in this construction are not inverted. These blocks are located near the ends of the resilient bushing 12 and carry less load than the center resilient block 24. The end blocks 22 and 26 seal the bushing and carry a portion of the load.

In this manner, the bushing maintains a balanced rigidity or resistance to movement without generating excessive heat. Since the resilient element is divided into separate blocks, the stress concentration is reduced as previously explained. The result is a simple and economical universal coupling and resilient bushing which are efficient in operation and which have a long service life.

Having thus described our invention, we claim:

1. A flexible connector for coupling a driving element with a driven element comprising an inner member, an outer member spaced therefrom, and a plurality of separate completely spaced apart resilient blocks affixed to said inner and outer members, at least one of said blocks being disposed in a balanced position so that the normal inner face of said block lies adjacent said outer member and the normal outer face of said block lies adjacent said inner member, said resilient block thus having an internal force therein which tends to return it to its normal position when displaced from its balanced position, and at least one of said blocks being disposed between said inner and outer members in normal position with the normal inner face adjacent the inner member and the normal outer face adjacent the outer member.

2. A flexible connector for coupling a driving element with a driven element comprising an inner member, an outer member spaced therefrom, and a plurality of separate completely spaced apart resilient blocks affixed to said inner and outer members, at least one of said blocks being disposed in a balanced position so that the normal inner face of said block lies adjacent said outer member and the normal outer face of said block lies adjacent said inner member, said resilient block thus having an internal force therein which tends to return it to its normal position when displaced from its balanced position, and at least one of said blocks being disposed between said inner and outer members in normal position with the normal inner face adjacent the inner member and the normal outer face adjacent the outer member, and means to prevent lateral slippage of said resilient blocks relative to said core.

3. A flexible connector for coupling a driving element with a driven element comprising a rounded central core having a plurality of annular grooves formed on the periphery thereof intermediate its ends, an outer shell spaced from and surrounding said core and having a plurality of grooves therein aligned with said first-named grooves, and a plurality of separate completely spaced apart resilient rings disposed one in each pair of aligned grooves, at least one of said rings being disposed in a balanced position so that the normal outer face of the ring is the inner face adjacent the core and the normal inner face which is normally adjacent the hole in the ring lies adjacent the outer shell, and at least one of said rings being disposed in normal position with the inner face lying adjacent the core and the outer face lying adjacent the outer shell.

4. A flexible connector for coupling a driving element with a driven element including a central barrel-shaped core having three annular grooves formed on the periphery thereof intermediate its ends, an outer shell spaced from and concentric with said core and having three grooves therein aligned with the first-named three grooves, a pair of separate completely spaced apart resilient substantially torus-shaped blocks disposed one in each aligned pair of end grooves, and a third separate substantially torus-shaped resilient block completely spaced apart from the other blocks and disposed in the middle pair of aligned grooves in a balanced position so that the normal inner face of the torus adjacent the hole is disposed in the groove in the outer shell and the normal outer face of the torus is disposed in the groove in the central core, thus creating a force in the middle block which tends to return it to its normal position when displaced from its balanced position.

References Cited in the file of this patent

UNITED STATES PATENTS

| | | |
|---|---|---|
| 2,115,713 | Haire | May 3, 1938 |
| 2,282,239 | Opsahl | May 5, 1942 |
| 2,482,488 | Julien | Sept. 20, 1949 |
| 2,560,620 | Whittam | July 17, 1951 |

FOREIGN PATENTS

| | | |
|---|---|---|
| 396,377 | Great Britain | July 31, 1933 |